United States Patent
Shiba et al.

(10) Patent No.: US 6,175,607 B1
(45) Date of Patent: Jan. 16, 2001

(54) PULSE COUNTER

(75) Inventors: Noriyuki Shiba, Tokyo; Ikuo Kotani, Ebina, both of (JP)

(73) Assignee: Kabushiki Kaisya Tokyo Kikai Seisakusho (JP)

( * ) Notice: Under 35 U.S.C. 154(b), the term of this patent shall be extended for 0 days.

(21) Appl. No.: 09/348,064

(22) Filed: Jul. 6, 1999

(30) Foreign Application Priority Data

Jul. 7, 1998 (JP) .................................................. 10-192007

(51) Int. Cl.$^7$ ...................................................... G07C 3/00
(52) U.S. Cl. .............................. 377/16; 377/2; 377/47; 377/49
(58) Field of Search .................................. 377/16, 47, 49, 377/2

(56) References Cited

U.S. PATENT DOCUMENTS

| 5,423,192 | * | 6/1995 | Young et al. | ......................... | 62/228.4 |
| 5,929,578 | * | 7/1999 | Atarashi | ................................. | 318/430 |

* cited by examiner

*Primary Examiner*—Margaret R. Wambach
(74) *Attorney, Agent, or Firm*—Bierman, Muserlian and Lucas

(57) ABSTRACT

The pulse counter counts high speed pulses and detects an absolute phase difference among a plurality of electric motors.

Pulse outputs 5 and 6 from pulse generators 3 and 4 are inputted into integrating counters 15 and 16 through pulse converters 9 and 11 and rotation direction detectors 10 and 12. Integrating counters 15 and 16 count up/dow the pulses in response to the rotation direction. Integrating counters 15 and 16 are cleared with a zero phase pulse output 7, outputted per revolution from the pulse generators 3 and 4. Multipliers 19 and 20 multiply outputs from the integrating counters 15 and 16 by a ratio set by a coefficient unit, and output a signal corresponding to the rotation angle of each electric motor.

Adder/subtractor 21 estimates a deviation between the outputs of the multipliers 19 and 20 such that the phase difference between the pulse generators 3 and 4 is estimated.

2 Claims, 2 Drawing Sheets

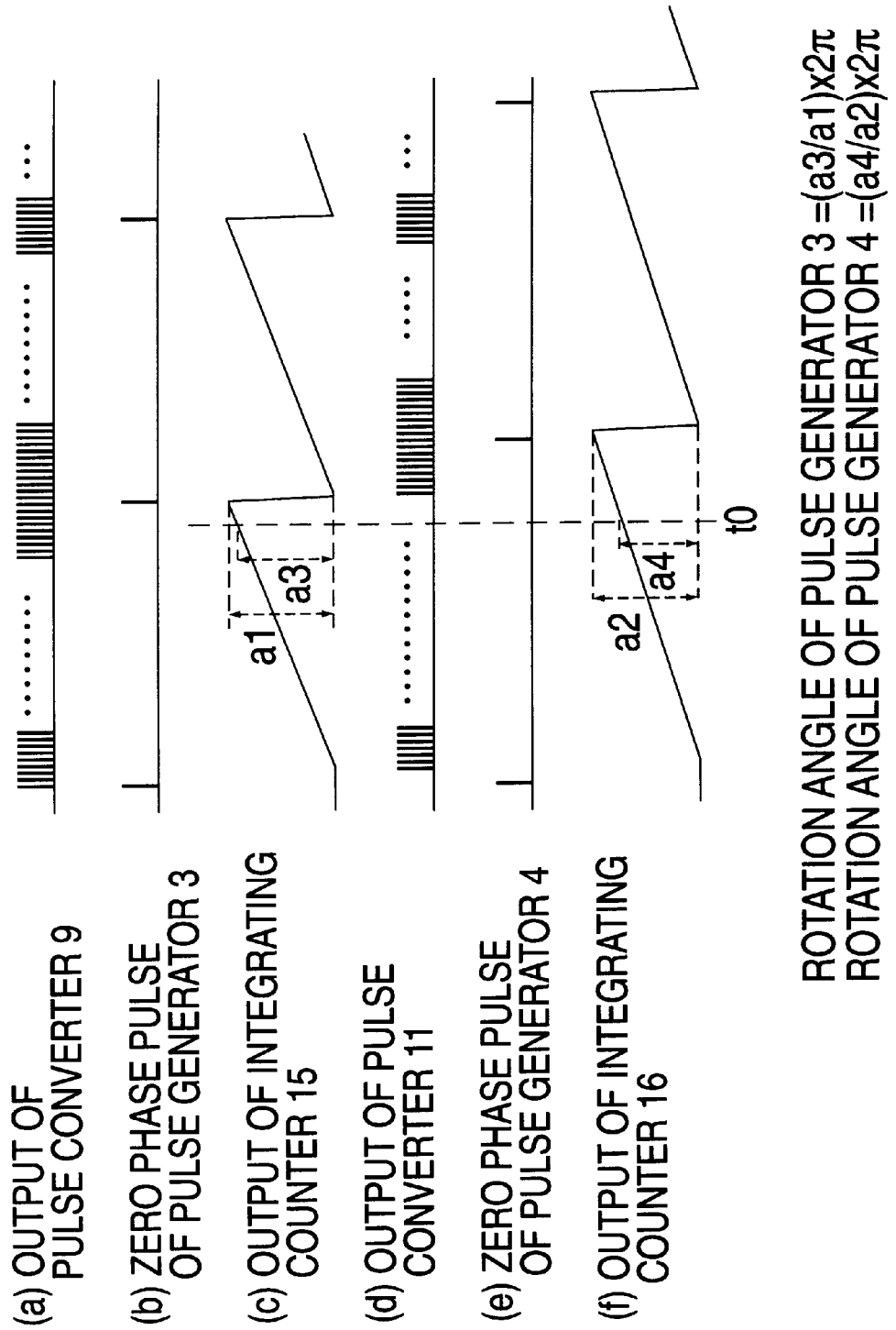

PULSE COUNTER

BACKGROUND OF THE INVENTION

1. Field of the Invention

The present invention relates to a pulse counter for counting a pulse train outputted in response to the rotation of an electric motor, and more particularly, to a pulse counter used for simultaneously controlling a plurality of electric motors in a highly accurate manner.

2. Description of the Prior Art

In an electric motor driving device which simultaneously drives two electric motors, it is usual to control revolutions of each electric motor by inputting the pulse trains outputted from the electric motors and counting the difference between the pulse numbers outputted from the electric motors with a pulse counter.

To create the pulse train from the electric motor, a pulse generator is mounted on each of the electric motors. The pulse generated by the pulse generator has a very high frequency. This leads to a problem in that there is a limitation to processing the high frequency outputted pulse.

It is usual that the number of pulses per revolution generated by the pulse generator is not fixed and changes in response to the machines which are driven by the electric motors and the applications to which those machines are subject.

When an incremental pulse generator is used, it is difficult to obtain synchronized operation of two electric motors and keep an absolute phase difference between the two electric motors at all times.

It is an object of the present invention to provide a pulse counter capable of counting high frequency pulses and easily dealing with such high frequency pulses even though the number of pulses per revolution generated from the pulse generator is different. Furthermore, the present invention detects an absolute phase difference between a plurality of the electric motors.

SUMMARY OF THE INVENTION

A pulse counter which simultaneously counts the pulse generated from a plurality of electric motors in a highly accurate manner has now been discovered. The pulse counter of the present invention counts a pulse signal outputted from an incremental pulse generator mounted on two or more electric motors.

Broadly, the pulse counter of the present invention comprises integrating counters of the number corresponding to that of the electric motors, a coefficient unit for setting a ratio, and a multiplier.

Inputted into the integrating counter from the incremental pulse generator are a pulse output in response to a rotation angle, and a zero phase pulse output outputted per revolution.

Once the pulse output in response to the rotation angle is inputted into the integrating counter, the integrating counter counts the pulse output one by one. The integrating counter resets the counted value once the zero phase pulse in inputted. The integrating counter can easily count the pulse output and the zero phase pulse output even though those outputs are at high speeds by adding only the simple function described above on the integrating counter.

A pulse number from the pulse generator can be corrected by providing the coefficient units and the multiplier for multiplying coefficients from the coefficient units by the counted value of the integrating counter. The multiplier and the coefficient unit need not be operated each time the pulse output from the pulse generator and the zero phase pulse output are inputted. The multiplier and the coefficient unit need only process arithmetic operation at the time required for control.

More specifically, the integrating counter counts the pulse output in response to the rotation angle from the pulse generator attached to the electric motor one by one as described above. Since the function is simple, it can also count the pulse output at high frequency, for example, above 1 MHz. The integrating counter is cleared with the zero phase signal. A user can be informed of the rotation angles of the pulse generator and the respective electric motor at all times by permitting the output of the integrating counter to use a zero of the pulse generator as 0.

The coefficient unit is provided, and multiplication of the coefficient from the coefficient unit and the counted value from the integrating counter accomplished in a microprocessor (hereinafter referred to as a MPU) whereby arithmetic operation is effected only at a time required for controlling the motor without following a rapid change in the signal input from the pulse generator. With the construction described above, pulse numbers per revolution of a plurality of electric motors can be made the same.

The present invention also has an arithmetic operation unit for calculating a deviation of the foregoing multiplier whereby a deviation, namely a phase difference between the output pulses from the pulse generators is calculated.

The pulse counter of the present invention also allows a user to be accurately informed of a phase difference between different electric motors, and hence two or more electric motors can be operated simultaneously in a highly accurate manner.

The phase difference between two or more electric motors may be calculated in the arithmetic operation unit at the necessary time, and hence it is not necessarily to calculate the same every time the pulse output and the zero phase pulse output from the pulse generators.

BRIEF DESCRIPTION OF THE DRAWINGS

These and other aspects of the present invention may be more fully understood by reference to the following drawings wherein:

FIG. 2 is a view illustrating the operation of an integrating counter in the embodiment of the present invention.

DETAILED DESCRIPTION OF THE PREFERRED EMBODIMENTS

Figure 1:
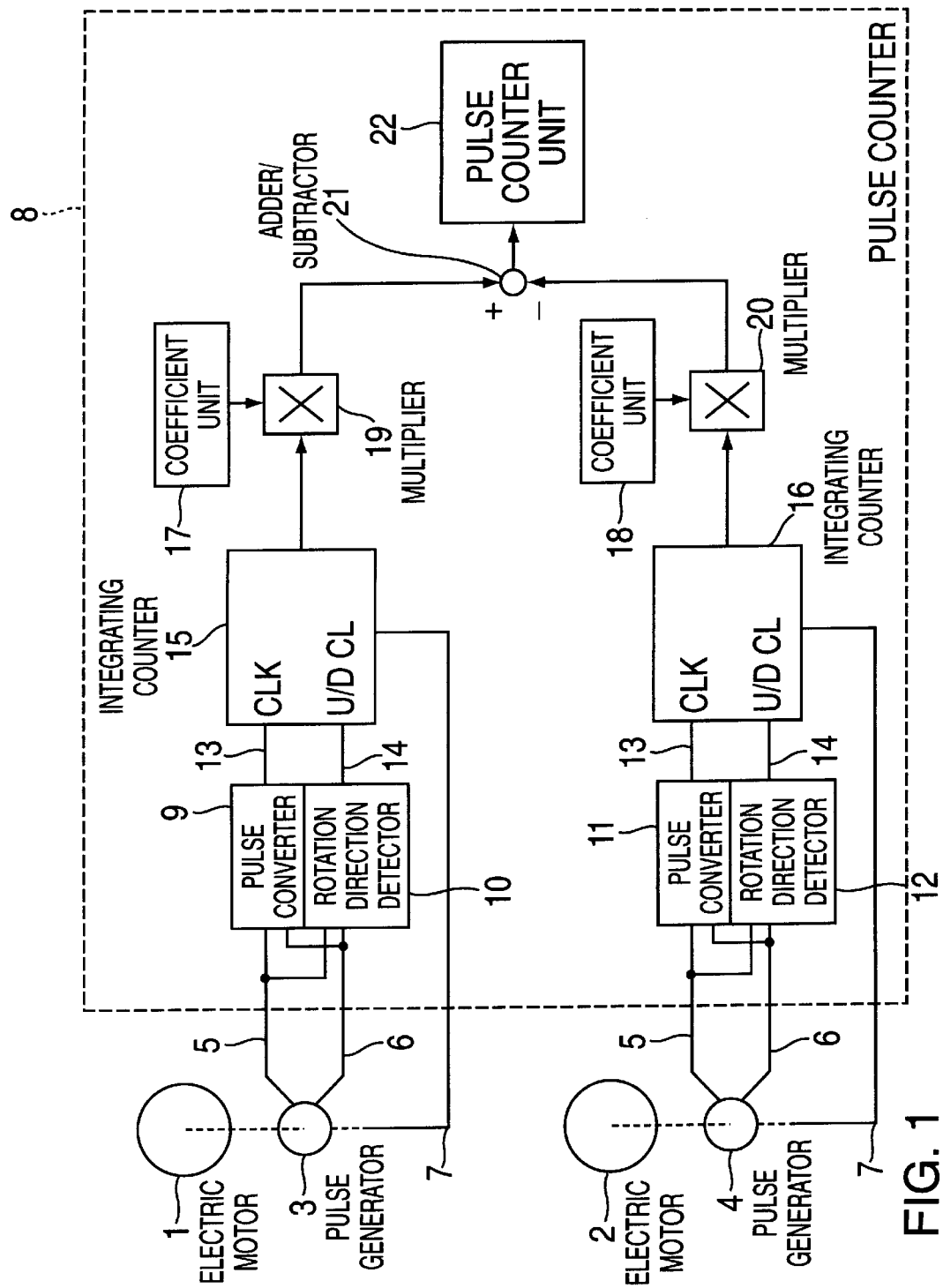
FIG. 1 is a view illustrating the construction of an embodiment of the present invention.

FIG. 1 illustrates the construction of a preferred embodiment of the pulse counter in accordance with the present invention.

As illustrated in FIG. 1, electric motors 1 and 2 are connected to output pulse generators 3 and 4 respectively. Output pulse generators 3 and 4 are two phase output generators and output A phase and B phase. Output pulse generators 3 and 4 are mounted on electric motors 1 and 2 in a conventional manner and output A phase signal 5, B phase signal 6 and zero phase signal 7 of the electric motor to which they are connected. Pulse counter 8, shown in dashed lines, receives signals 5, 6 and 7 from each electric motor.

The components of pulse counter 8 will now be described in more detail. A phase signal 5 and B phase signal 6 are each inputted into pulse converters 9 and 11 and rotation direction detectors 10 and 12, both of which are housed in pulse counter 8. Pulse converters 9 and 11 convert signals 5 and 6 into one phase and output pulse train signal 13. Rotation direction detectors 10 and 12, which are also housed in pulse counter 8, detect the forward or backward rotation of the respective electric motor and output rotation direction signal 14. Rotation direction signal 14 corresponds to the rotational direction of the motor. Pulse train signal 13 and rotation direction signal 14 are generated for each rotation of the electric motors.

Pulse train signal 13, rotation direction signal 14 and zero phase signal 7 are inputted into integrating counters 15 and 16, as shown. Integrating counters 15 and 16 count the pulse train signal 13 and count up and down in response to the rotation direction signal 14. Integrating counters 15 and 16 are in up/down mode by inputting a "high level signal Hi" or a "low level signal Lo". Pulse train signal 13 is inputted to CLK inputs of integrating counters 15 and 16. Integrating counters 15 and 16 count up or down one by one each time pulse train signal 13 is inputted into CLK inputs. Zero phase signal 7 is inputted into integrating counters 15 and 16 to clear (CL) inputs in the integrating counters. Counted values in integrating counters 15 and 16 are reset to zero for each revolution of the electric motor.

The output from integrating counters 15 and 16 is inputted into units 19 and 20, respectively. Coefficient multipliers 17 and 18 input coefficients into multipliers 19 and 20, respectively. Multipliers 19 and 20 multiply the coefficient from the respective coefficient units 17 and 18 by the output from the integrating counters 15 and 16.

Integrating counters 15 and 16 have a simple construction and are operated with pulses 5, 6 and 7 from pulse generators 3 and 4. Because of this, the integrating counters 15 and 16 operate at high speed.

The output from multipliers 19 and 20 is inputted into adder/subtractor 21. The output from adder/subtractor 21 is inputted into pulse counter unit 22. Pulse counter unit 22 counts a deviation obtained from adder/subtractor 21.

FIG. 2 illustrates the operation of integrating counters 15 and 16 in accordance with the present invention. The output of pulse converter 9, the pulse train signal 13, is illustrated at (a) while the output of pulse converter 11 is illustrated at (d). As can be seen, these two outputs are not the same. Zero phase signal 7 from pulse generator 3 is illustrated at (b) while zero phase signal 7 from pulse generator 4 is illustrated at (e). As can be seen, these two zero phase signals are not the same. The output of the integrating counters 15 and 16 are illustrated respectively at (c) and (f).

As illustrated in FIG. 2, integrating counters 15 and 16 count output pulses from pulse converters 9 and 11 and are cleared once the zero phase signal is inputted. Thereafter, the integrating counters 15 and 16 start to count the output of pulse converters 9 and 11.

This means that the counted value of integrating counters 15 and 16 corresponds to the rotational angles of pulse generators 3 and 4. For example, at a point in time, t0, the counted values from the integrating counters 15 and 16 are a3 and a4 respectively. The pulse numbers per revolution from pulse generators 3 and 4 are a1 and a2 respectively. The zero phase signal is taken as the start point. The rotation angles of pulse generators 3 and 4 at time, t0, are $2\pi (a3/a1)$ and $2\pi (a4/a2)$.

Counted values a3 and a4 from the integrating counters 15 and 16 become those corresponding to the rotation angles of pulse generators 3 and 4.

Coefficient units 17 and 18 are provided because the number of pulses generated per revolution of pulse generators 3 and 4 are frequently different for each installation, and hence the coefficients of the coefficient units 17 and 18 and the counted values of integrating counters 15 and 16 are operated on in multipliers 19 and 20.

Multipliers 19 and 20 correct the number of pulses per revolution of pulse generators 3 and 4. This is not performed at all times, but performed only at a timing required for control.

For example, coefficient units 17 and 18 and multipliers 19 and 20 are constructed with MPUs, which are prevented from operating each time the pulse outputs from pulse generators 3 and 4 and the zero phase pulse output are inputted. The counted values of integrating counters 15 and 16 are sampled at a time required for the control for correction operation. Thereby, the numbers of pulses per revolution of the different pulse generators can be made hypothetically the same even though the operation does not follow the changing rate of each input pulse from pulse generators 3 and 4. Thus, there are ensured values corresponding to the rotation angles of pulse generators 3 and 4.

More specifically, in FIG. 2, the number of pulses per revolution of pulse generator 3 is assumed to be a1 and that of the pulse generator 4, a2. The outputs of the multipliers 19 and 20 become values corresponding to the rotation angles of pulse generators 3, 4 by multiplying the counted value of integrating counter 16 by a coefficient a1/a2.

The number of pluses per revolution of a plurality of the pulse generators (electric motors) are made hypothetically the same by calculating the coefficients of coefficient units 17 and 18 and the counted values of integrating counters 15 and 16 as described above.

The pulse counter for both electric motors 1 and 2 as described above includes the pulse converters 9 and 11, the rotation direction detectors 10 and 12, the integrating counters 15 and 16, the coefficient units 17 and 18, and the multipliers 19 and 20, whereby a signal indicative of the rotation angle of each electric motor is ensured on the outputs of the multipliers 19 and 20.

A phase difference between the different electric motors is ensured by using adder/subtractor 21 for adding/subtracting the outputs of multipliers 19 and 20, and pulse counter unit 22 for counting an output of adder/subtractor 21, and inputting a deviation between processed results of the outputs of multipliers 19 and 20. The just-mentioned processing is also unnecessary to be executed each time the pulse outputs from pulse generators 3 and 4 and the zero phase pulse output are inputted, for example, adder/subtractor 21 and the pulse counter unit 22 may be constructed with MPUs as described above, and a value corresponding to the angle of rotation of an electric motor is sampled at a time required for the control to calculate a deviation therebetween.

Although in the above embodiment there were exemplarily illustrated the case with the two electric motors, it is a matter of course that a case with three or more electric motors can be constructed in the same manner.

As described above, the present invention is adapted such that an integrating counter is provided for each electric motor for counting a pulse output generated in response to the rotation angle of the electric motor, which counter is cleared with a zero phase pulse signal generated for each revolution of the electric motor, whereby the integrating counter can be constructed more simply, and the integrating counter can count high speed pulses even when the high speed pulses are generated from the pulse generator.

A multiplier is provided for correcting the number of pulses of a pulse generator whereby the number of pulses per revolution can be corrected even when there is used the pulse generator where the number of pulses generated for one revolution is different for each installation.

Operation processing by the foregoing multiplier is executed only with required sampling, whereby the operation responses to a high speed pulse generator to correct the number of pulses per revolution of a different pulse generator.

The foregoing functions are installed for each electric motor to calculate a deviation between outputs of the multipliers, whereby a phase difference between the electric motors can be detected highly accurately at a high speed which ensures a practically very useful function.

What is claimed is:

1. In a pulse counter for counting a pulse signal outputted from an incremental pulse generator mounted on two or more electric motors, the improvement comprising:

the pulse counter including integrating counters corresponding to the number of the electric motors, and a coefficient unit for setting a ratio and a multiplier;

said integrating counter receiving as inputs a pulse output outputted in response to a rotation angle from the pulse generator and a zero phase pulse output outputted for each revolution of the pulse generator to count said pulse outputs and to be cleared with said zero phase pulse output;

said multiplier outputting a signal corresponding to said rotation angle by multiplying an output of said integrating counter and the ratio set by said coefficient unit.

2. A pulse counter according to claim 1 wherein an arithmetic operation unit is provided for estimating a deviation between outputs of said multipliers.

* * * * *